Feb. 12, 1924.
E. C. COSTON
1,483,282
BOLT SLEEVE
Filed July 22, 1921
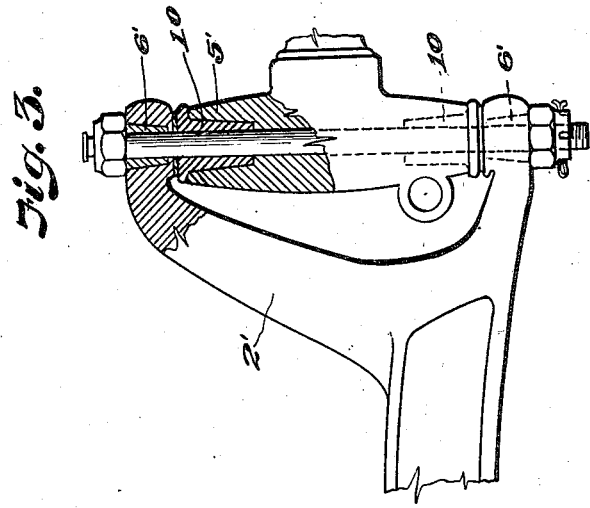
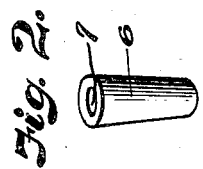
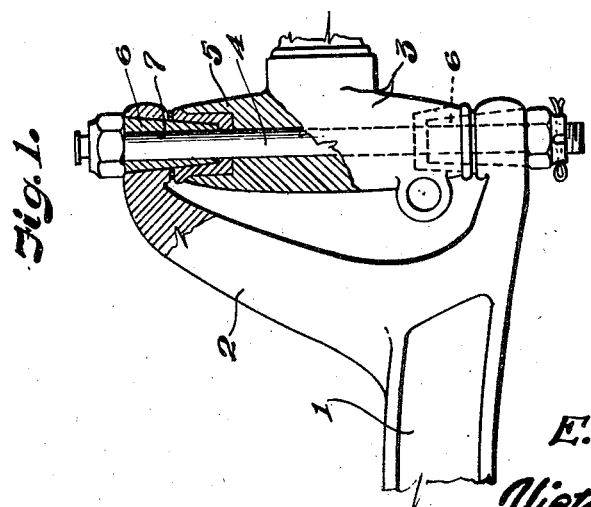
E. C. Coston.
INVENTOR
BY Victor J. Evans.
ATTORNEY Patented Feb. 12, 1924.

1,483,282

UNITED STATES PATENT OFFICE.

EDWARD C. COSTON, OF NEAR SKIDMORE, MISSOURI.

BOLT SLEEVE.

Application filed July 22, 1921. Serial No. 486,861.

*To all whom it may concern:*

Be it known that I, EDWARD C. COSTON, a citizen of the United States, residing near Skidmore, in the county of Nodaway and State of Missouri, have invented new and useful Improvements in Bolt Sleeves, of which the following is a specification.

This invention relates to bolt leaves particularly designed for use in connection with the spindle bolts of motor vehicles and an object of the invention is to provide a sleeve structure adapted to be mounted upon a spindle bolt to take up wear and permit firm and steady operation of the spindles at all times.

In certain types of motor vehicles considerable wear is occasioned by the spindle bolts upon the forked ends of the front axles thereof causing wobbling of the front wheels during travel, noise and inaccurate steering and it is an object of this invention to provide substantially frustoconical sleeves adapted to be mounted about the spindle bolt to prevent the wobbling of the bolt and consequent disadvantages.

Other objects of the invention will appear in the following detailed description and in the accompanying drawing wherein:

Fig. 1 is a fragmentary section through a spindle and forked end of a front axle showing the improved bolt sleeve in place.

Fig. 2 is a detail view of the bolt sleeve.

Fig. 3 is a fragmentary section similar to Fig. 1 illustrating a slight modification in the sleeve construction.

Referring more particularly to the drawing the front axle 1 of any approved type of vehicle has its end 2 forked, the arms of which are connected to the spindle 3 by means of the spindle bolt 4. The steering and travel of the front wheels of a vehicle cause considerable wear upon the ends of the arms 2 through which the bolt 4 extends and often causes wear in the head 5 of the spindle 3 resulting in inaccurate travel of the wheel impairing the steering accuracy of the vehicle and also causing undesirable noises. The present practice is to either rebore the arms and spindle head and use a larger bolt or provide new parts to overcome the disadvantages above enumerated while in the present invention a substantially frustoconical sleeve 6 is provided, the bore 7 of which snugly receives the spindle bolt 4 and the outer surface of which is tapered to cause a wedging action against the surfaces of the arms 2 and the substantially frustoconical bearing sleeve 5' carried by the spindle head 5 against which they abut so as to prevent vibratory movement of the bolt and spindle relative to the axle 1 during operation and take up wear thereby increasing the longevity of the parts. The sleeves 6 one of which is mounted at each end of the bolt 4 are tapered so as to fit in an opening reamed by a standard reamer and thus when the bearing surfaces of the arms 2, sleeve 5ᵃ and head 5 become irregularly worn they may be reamed out to receive the substantially frustoconical sleeves 6 and the sleeves may project a slight distance beyond the outer edges of the arms 2 so as to permit them to be forced into bearing openings as they wear to maintain a proper tight fit at all times. Substantially frusto-conical bearing sleeve 6 extends downwardly into the tapered portion of the bore of the bearing sleeve or bushing 5 providing definite bearing action between the fork 2 and spindle 5 which is such as to permit replacing of the bearing sleeve 6 when the parts become worn. The bearing sleeve or bushing 5ᵃ may also be easily replaced eliminating the necessity of discarding the spindle 5 in case of wear.

In Fig. 3 of the drawing a slight modification of the sleeve structure is shown in which the substantial frustoconical sleeves do not extend into the head 5' of the spindle but extend only partially through the arms 2', wear in the head 5' being taken up by the bushing 10.

It is, of course, to be understood that the invention may be constructed in various other manners and the parts associated in different relations and, therefore, I do not desire to be limited in any manner except as set forth in the claim hereunto appended.

Having thus described my invention what I claim is:

The combination with the forked end of a vehicle front axle, a spindle head, and a spindle bolt, of a substantially frusto-conical bearing bushing embedded in the ends of the spindle and provided with a bore, a portion of which is relatively large and tapered with respect to the spindle bolt, a substantially frusto-conical bearing sleeve extending through the arms of the forked end of the axle and into the tapered portion of the bore of said bearing bushing.

In testimony whereof I affix my signature.

EDWARD C. COSTON.